United States Patent [19]

Sasayama

[11] 4,155,957

[45] May 22, 1979

[54] PROCESS FOR THE PRODUCTION OF SELF-SWELLING LEAKAGE-PREVENTING MATERIALS

[75] Inventor: Hiroharu Sasayama, Ageo, Japan

[73] Assignee: C. I. Kasei Company, Limited, Tokyo, Japan

[21] Appl. No.: 825,018

[22] Filed: Aug. 16, 1977

[30] Foreign Application Priority Data

Aug. 23, 1976 [JP] Japan ............................... 51-1003851

[51] Int. Cl.$^2$ ............................................. C08L 23/08
[52] U.S. Cl. ................................ 260/897 B; 428/394; 428/396; 260/30.4 R; 260/32.6 PQ; 260/33.4 PQ
[58] Field of Search ....... 260/897 B, 30.4 R, 32.6 PQ, 260/33.4 PQ

[56] References Cited

U.S. PATENT DOCUMENTS

| | | | |
|---|---|---|---|
| 3,642,726 | 2/1972 | Hellman | 260/785 T |
| 3,765,829 | 10/1973 | Lambert | 260/897 B X |
| 3,966,672 | 6/1976 | Gaylord | 260/42.14 |

*Primary Examiner*—Carman J. Seccuro
*Attorney, Agent, or Firm*—Sprung, Felfe, Horn, Lynch & Kramer

[57] ABSTRACT

A self-swelling leakage-preventing material is produced by reacting under heat a mixture of a copolymer of a lower olefin such as isobutene with maleic anhydride, a polymer emulsion having compatibility with the copolymer, such as an ethylene-vinyl acetate copolymer emulsion, and a compound having at least two functional groups selected from the group consisting of hydroxyl groups, amino groups and epoxy groups, such as ethylene glycol, until a cross-linked product having a swelling rate of 5–40 times is obtained. The mixture itself may be shaped into a suitable form prior to the reaction. A core material such as a non-woven fabric may be impregnated with the mixture prior to the reaction.

7 Claims, 2 Drawing Figures

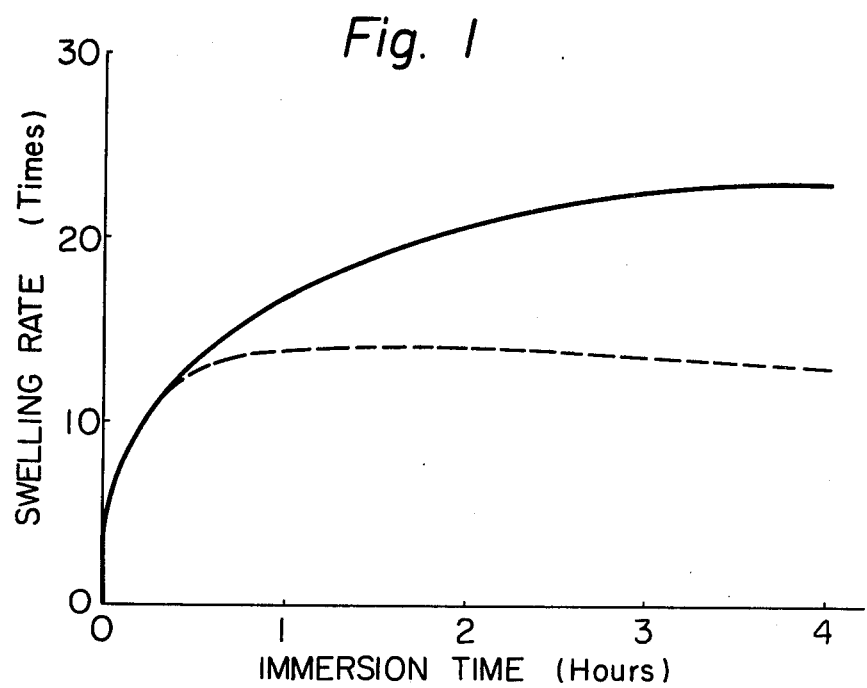
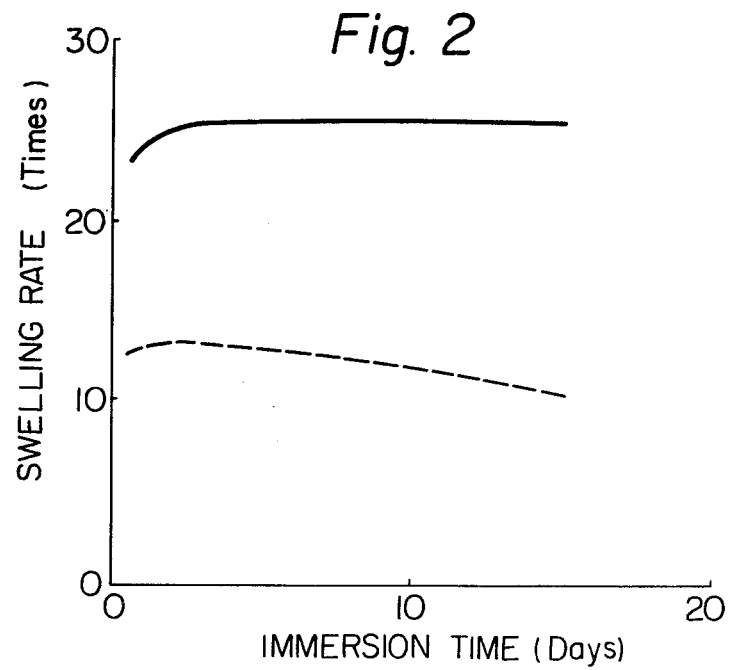

PROCESS FOR THE PRODUCTION OF SELF-SWELLING LEAKAGE-PREVENTING MATERIALS

BACKGROUND OF THE INVENTION

The present invention relates to a process for the production of a novel self-swelling leakage-preventing material capable of swelling by absorption of water and preventing leakage of water by clogging interstices.

In public works and construction works, cracks, cleavages or interstices often form in the places where mortar or concrete has been applied or wherein water-supplying pipes are jointed, and often make a cause of leakage of water. In the prior art, such cracks or interstices are filled with a leakage-preventing material based on rubber, plastics and bitumen, such as rubber packing materials, rubber sealants and bitumen jointing materials. During the use for a long period of time, these materials tend to permit deterioration of the materials per se or formation of interstices due to change in size of interstices in the structure to which the meterials had been applied so that leakage of water may again occur in the place to which the materials had been applied. A leakage-preventing material of such type as can be swollen with the passing out water and can seal interstices or pores to stop leakage of water was also proposed to overcome the drawbacks caused by the above mentioned materials per se. However, such material also cannot stably be used for a long period of time because of its poor swelling rate and poor gel strength. Thus, there has not yet been found a practically advantageous leakage-preventing material in this art.

As a result of extensive researches made to develop a leakage-preventing material which is easily capable of being swollen with water and has satisfactorily high gel strength and swelling rate and which can maintain these useful properties stably for a long period of time, it has now been found that such purpose can be achieved by subjecting a copolymer having acid anhydride residues, a polymer emulsion having compatibility with the copolymer and a polyhydric or polyfunctional compound to crosslinking to form a crosslinked product having a desired swelling rate. The present invention has been accomplished on the basis of the above finding.

BRIEF SUMMARY OF THE INVENTION

In accordance with the present invention, there is provided a process for the production of a self-swelling leakage-preventing material, characterized by reacting under heat a mixture of (a) a copolymer of a lower olefin and maleic anhydride, (b) a polymer emulsion having compatibility with the copolymer and (c) a compound having at least two functional groups selected from the group consisting of hydroxy groups, amino groups and epoxy groups, until a crosslinked product having a swelling rate of 5–40 times is obtained.

It is an object of the present invention to provide a process for the production of a novel self-swelling leakage-preventing material.

It is another object of the present invention to provide a process for the production of a self-swelling leakage-preventing material excellent in swelling rate.

It is further object of the present invention to provide a process for the production of a self-swelling leakage-preventing material which can exhibit good leakage-preventing effect for a long period of time and is not deteriorated in its effect even when drying and swelling are repeatedly applied.

Other objects, features and advantages of the present invention will be apparent from the following description taken in connection with the accompanying drawings wherein:

FIGS. 1 and 2 are graphs showing respectively the relation between the swelling rate and the immersion time in Example 1 and Comparative Example.

DETAILED DESCRIPTION OF THE INVENTION

The copolymer utilizable in the present invention as the above component (a) can be obtained by polymerizing a lower olefin such as ethylene, propylene, n-butene, isobutene, 1-pentene, 2-pentene or 2-hexene and maleic anhydride in a proper solvent such as dimethylformamide in the presence of a radical polymerization initiator such as a persulfate. This copolymer is advantageously converted, prior to the actual use, into a water-soluble form, for example, by neutralization with ammonia water.

The polymer emulsion utilizable as the above component (b) is a known polymer emulsion having compatibility with the component (a), for example, an ethylene-vinyl acetate copolymer emulsion or an acrylic polymer emulsion. The polymer emulsion is used in an amount of 20–100 parts by weight (solid), preferably 50–60 parts by weight per 100 parts by weight of the component (a).

Illustrative of the polyhydric or polyfunctional compound as the above component (c) are, for example, ethylene glycol, propylene glycol, glycerol, glycidyl alcohol, diglycidyl ether, ethanolamine, ethylenediamine, propylenediamine, polyethylene glycol, trimethylolpropane and pentaerythritol. This compound is used in an amount corresponding to 1–10 equivalent functional groups per equivalent of the carboxyl groups present in the copolymer as the component (a).

In the present invention, a mixture of the above components (a), (b) and (c) may be incorporated, if desired, with a foaming agent, an antioxidant, a dye, a pigment and the like conventional additive.

A mixture prepared in this manner by mixing the individual components is optionally incorporated with an appropriate amount of water and shaped into a desired form, for example, a sheet or block. Alternatively, a core material such as a nonwoven cloth, fabric, rope, knit cloth or string is impregnated with the mixture. The shaped article or the impregnated core material is dried for dehydration and reacted under heat until a crosslinked product having a swelling rate of 5–40 times is obtained.

It is necessary in the present invention to perform the crosslinking reaction until the swelling rate of the resultant crosslinked product becomes 5–40 times. If the crosslinking reaction proceeds beyond the swelling rate of the above range, the resultant product will no longer be furnished with the function necessary as swelling leakage-preventing material. On the other hand, if the crosslinking reaction fails to proceed to such stage that the product may have the above defined swelling rate, the product obtained will be poor in gel strength so that satisfactory leakage-preventing effect cannot be expected.

A proper heating condition includes a period from 10 minutes to 8 hours at a temperature of 80°–120° C., preferably 4 hours at 80° C. and 1 hour at 100° C.

In case the leakage-preventing material is shaped by extrusion or calendering, the content of water in the shaping composition is usually 5-40%, preferably 10-30%. In case the leakage-preventing material is shaped by spreading of the shaping composition or by impregnating a core material with the shaping composition, the content of water in the shaping composition is usually 30-70%, preferably 40-60%.

Heretofore, a contradictory relation is known between the swelling rate and the gel strength; increase of the swelling rate by absorption of water incurs reduction of the gel strength, while enhancement of the gel strength incurs reduction of the swelling rate. According to the present invention, however, unexpectedly remarkable merits can be achieved in that the gel strength can appreciably be enhanced without damaging the swelling rate by addition of the polymer emulsion which, in the prior art, is rather considered to be harmful to swelling by absorption of water for the reason that the emulsion becomes filmy and hydrophobic after drying and the subsequent heating.

The leakage-preventing material obtained according to the present invention charged into interstices of structures well complies with any enlargement of the interstices caused by dimensional change of the structure so that the material can exhibit a stable leakage-preventing effect for a long period of time. Further, the leakage-preventing material has a merit in that its effect is not adversely affected even in the event the material is repeatedly dried and swollen. Thus, the material is particularly suitable as a seal for filling up gaps between segments in tunnel construction, a seal for a joint portion of fume pipes, a seal for filling up interstices in the outer wall panels of buildings, and a wind-seal.

The present invention will now be illustrated in more detail by way of examples.

In each example, the leakage-preventing test is carried out by fixing a sheet of the material between two flanges with 4 bolts at a binding pressure of 400kg/cm$^2$, injecting water into the flanges to let the sample absorb water, increasing the clearance between the two flanges by 2mm with the aid of a spacer and injecting water under pressure.

EXAMPLE 1

A non-woven polyester fabric having a basis weight of 60kg/m$^2$ was immersed into a liquid mixture of 100 parts by weight of isobutene-maleic anhydride copolymer (polymerization degree: 500) neutralized with ammonia water, 100 parts by weight of polyethylene glycol having a molecular weight of 200, 100 parts by weight of an aqueous emulsion (50% in solid content) of ethylene-vinyl acetate copolymer and 250 parts by weight of water. The non-woven fabric was impregnated with the mixture at a rate of 600g/mm$^2$ and then air dried for 15 minutes at 90° C. The impregnated non-woven fabric was then heated at 80° C. for 4 hours whereby a leakage-preventing material (1mm in thickness) comprising a swelling substance was formed.

The leakage-preventing material thus obtained was dipped for 3 hours into water kept at 20° C. to permit gelation and swelling of the material whereby the swelling rate was 22.0 times and the loss rate of the material from the non-woven fabric was 11.6%. As a result of a leakage-preventing test of this material, no leakage of water was observed at a water pressure of 7.5kg/cm$^2$.

The relation between the immersion time (immersion days) and the swelling rate of this material is shown in FIGS. 1 and 2 by a solid line.

COMPARATIVE EXAMPLE

The non-woven fabric was impregnated in the same manner as dexcribed in Example 1 with a liquid mixture of 100 parts by weight of the same copolymer as described in Example 1, 100 parts by weight of the same polyethylene glycol as described in Example 1 and 300 parts by weight of water. The non-woven fabric was then treated in the same manner as described in Example 1 to prepare a swelling substance. The swelling rate of this material was 15.3 times while the loss rate of the material from the non-woven fabric was 46.3%. As a result of a leakage-preventing test of this material, leakage of water began at a water pressure of 30kg/cm$^2$ and the water pressure was rapidly reduced.

The relation between the immersion time (immersion days) and the swelling rate of this material is shown in FIGS. 1 and 2 by a broken line.

EXAMPLE 2

To a mixture of 100 parts by weight of isobutylene-maleic anhydride copolymer (polymerization degree: 500) neutralized with ammonia water, 60 parts by weight of polyethylene glycol having a molecular weight of 200, 200 aprts by weight of an aqueous emulsion (50% in solid content) of ethylene-vinyl acetate copolymer and 100 parts by weight of silicon oxide powder (average particle size: 200 mesh; SiO$_2$ content: 97% or more) were added 5 parts by weight of water. Using 8" kneading rolls, the mixture was shaped into a sheet which was than pressed to obtain a sheet of 1mm in thickness. This article was subjected to a heat treatment conducted at 80° C. for 3 hours whereby a swelling substance was prepared. As a result of a leakage-preventing test of this substance, no leakage of water was observed at a water pressure of 7.5kg/cm$^2$ as in the case of Example 1. The swelling rate of this material was 6-7 times.

EXAMPLE 3

To a mixture of 100 parts by weight of isobutylene-maleic anhydride copolymer (polymerization degree: 500) neutralized with ammonia water, 60 parts by weight of polyethylene glycol having a molecular weight of 200 and 200 parts by weight of an aqueous emulsion (50% in solid content) of ethylene-vinyl acetate copolymer were added 100 parts by weight of water. The mixture was shaped into a sheet according to the spreading method whereby a sheet of 1mm in thickness was obtained. The sheet was subjected to a heat treatment conducted at 80° C. for 3 hours whereby a swelling substance was formed.

As a result of the leakage-preventing test of this substance, no leakage of water was observed as in the case of Example 1 at a water pressure of 7.5kg/cm$^2$. The swelling rate of this substance was 5-6 times.

What is claimed is:

1. A process for the production of a self-swelling leakage-preventing material, characterized by reacting under heat a mixture of a copolymer of a lower olefin and maleic anhydride, an ethylene-vinyl acetate copolymer emulsion having a compatibility with said copolymer, and a compound having at least two functional groups selected from the group consisting of hydroxy groups, amino groups and epoxy groups, until a crosslinked product having a swelling rate of 5–40 times is obtained, about 20 to 100 parts of the ethylene-vinyl actetate copolymer being employed per 100 parts by weight of the olefin-maleic anhydride copolymer.

2. A process according to claim 1 wherein said lower olefin is ethylene, propylene, n-butene, isobutene, 1-pentene, 2-pentene or 2-hexene.

3. A process according to claim 2 wherein said lower olefin is isobutene.

4. A process according to claim 1 wherein said compound having at least two functional groups is at least one selected from the group consisting of ethylene glycol, propylene glycol, glycerol, glycidyl alcohol, diglycidyl ether, ethanolamine, ethylenediamine, propylenediamine, polyethylene glycol, trimethylolpropane and pentaerythritol.

5. A process according to claim 1 wherein said compound having at least two functional groups is used in an amount corresponding to 1–10 equivalent functional groups per equivalent of the carboxyl groups present in said copolymer.

6. A process according to claim 1 wherein a core material is impregnated with said mixture.

7. A self-swelling leakage-preventing material obtained by the process according to claim 1.

* * * * *

UNITED STATES PATENT AND TRADEMARK OFFICE
CERTIFICATE OF CORRECTION

PATENT NO. : 4,155,957
DATED : May 22, 1979
INVENTOR(S) : Hiroharu Sasayama

It is certified that error appears in the above-identified patent and that said Letters Patent are hereby corrected as shown below:

Priority Number should be "100388" not "1003851.

Signed and Sealed this

Twelfth Day of August 1980

[SEAL]

Attest:

SIDNEY A. DIAMOND

Attesting Officer — Commissioner of Patents and Trademarks